United States Patent [19]

Lee

[11] Patent Number: 4,696,173
[45] Date of Patent: Sep. 29, 1987

[54] VEHICLE STEERING WHEEL AND SHIFT LEVER GUARD

[76] Inventor: James D. Lee, 22340 Natasha La., South Lyon, Mich. 48178-9713

[21] Appl. No.: 839,606

[22] Filed: Mar. 14, 1986

[51] Int. Cl.⁴ .................. E05B 13/02; E05B 17/14
[52] U.S. Cl. .................................................. 70/427
[58] Field of Search .................. 70/18, 237, 238, 252, 70/425, 428, 427

[56] References Cited

U.S. PATENT DOCUMENTS

| | | | |
|---|---|---|---|
| 3,811,303 | 5/1974 | Robertson | 70/18 |
| 4,008,589 | 2/1977 | Harrell | 70/18 |
| 4,074,550 | 2/1978 | Rowlings | 70/428 |
| 4,118,961 | 10/1978 | Lee | 70/18 |
| 4,134,279 | 1/1979 | Ross et al. | 70/18 |
| 4,317,346 | 3/1982 | Gutman | 70/238 |
| 4,598,562 | 7/1986 | Freeman | 70/237 |

*Primary Examiner*—James L. Ridgill, Jr.
*Attorney, Agent, or Firm*—Barnes, Kisselle, Raisch, Choate, Whittemore & Hulbert

[57] ABSTRACT

A vehicle protective guard with an arm and a carrier member which in assembled relation encircles the housing of a steering column. When assembled a stop on the arm underlies the transmission shift on the steering column to prevent sufficient movement of the lever to engage the transmission. The stops on the arm also project into the path of spokes on a steering wheel to limit the extent to which the wheel can be turned to steer the vehicle. To facilitate installation and use of the guard the arm is removably connected to the carrier by a hinge joint which permits the arm to pivot to locking and released positions.

20 Claims, 4 Drawing Figures

VEHICLE STEERING WHEEL AND SHIFT LEVER GUARD

FIELD OF THE INVENTION

This invention relates to devices for preventing the theft of motor vehicles such as automobiles, and more particularly to a protective guard for preventing unauthorized use of a steering wheel and a gear shift lever on a steering column to drive away the vehicle under its own power.

BACKGROUND OF THE INVENTION

Most modern automobiles are equipped with an ignition switch on the steering column which when locked, also locks the steering wheel and the transmission shift lever carried by the column thereby preventing unauthorized operation of the motor vehicle even if the engine is started without turning on the ignition switch, such as by so-called hot wiring or jumpering of the ignition switch. The steering and shift lever locks are normally engaged and released by movement of a rack mounted in the column and connected to the locks by wires. Normally, the rack is actuated by a pinion coupled to the ignition switch so that it is driven by manually turning the switch on and off. This rack and pinion, the ignition switch and a turn signal switch usually are all enclosed in a housing made of metal or plastic with relatively thin walls so that is has relatively low strength.

Thieves of motor vehicles have developed satisfactory tools and methods for either rapidly breaking this housing or rapidly engaging and pulling the ignition switch out of the steering column to thereby gain access to the rack so that it can be manually moved to unlock the steering wheel and shift lever, so that after the engine is started, the shift lever can be moved to engage the transmission and the vehicle can be steered and driven away under its own power. Replacement of the parts and repair of the damage caused by breaking this housing and pulling out the ignition switch is expensive and usually costs several hundred dollars.

Various protective guards for preventing unauthorized access to ignition switches in steering columns have been previously developed and one such protective guard is shown in U.S. Pat. No. 4,118,961 issued on Oct. 10, 1978. While this guard prevents unauthorized access to the ignition switch, it does not prevent the steering column housing from being broken to provide unauthorized access to the rack for releasing the steering wheel and shift lever locks so that the vehicle can be driven away under its own power.

SUMMARY OF THE INVENTION

A protective guard embodying this invention has an arm receivable on a carrier member and in asssembly encircles a housing of a vehicle steering column. In assembled relation, stops carried by the arm underlie and limit movement of the shift lever to prevent it from being utilized to put the transmission in gear and project into the plane of the spokes of the steering wheel to limit the extent to which it can be turned even if the steering wheel and shift lever locks have been released. When assembled, generally axial and rotary movement of the guard relative to the steering column is limited by a cavity of the carrier which receives a generally radially projecting portion of the column housing which encloses a turn signal switch carried by the steering column.

To facilitate use of the guard, the carrier can be retained on the steering column and the arm is connected by a hinge joint to the carrier so that it can be removed when the guard is not in use to limit movement of the shift lever and steering wheel. Preferably, in assembly, the guard also shields the housing of the steering column so that it cannot be readily broken to gain access to the rack and connecting wires to release the wheel and shift lever locks.

OBJECTS, FEATURES AND ADVANTAGES OF THE INVENTION

Objects, features and advantages of this invention are to provide a protective guard which prevents unauthorized movement of the shift lever to engage the transmission and sufficient turning of the steering wheel to enable driving a vehicle on the open road under its own power even if its steering and shift lever locks have been released, can be quickly and easily mounted on and removed from a steering column, shields the column housing from breakage, can be released by authorized personnel without removing the entire guard from the steering column, and is comparatively compact, lightweight, of simple design and economical construction, manufacture and assembly.

BRIEF DESCRIPTION OF THE DRAWINGS

These and other objects, features and advantages of this invention will be apparent from the following detailed description, appended claims and accompanying drawing in which:

DETAILED DESCRIPTION

Figure 1:
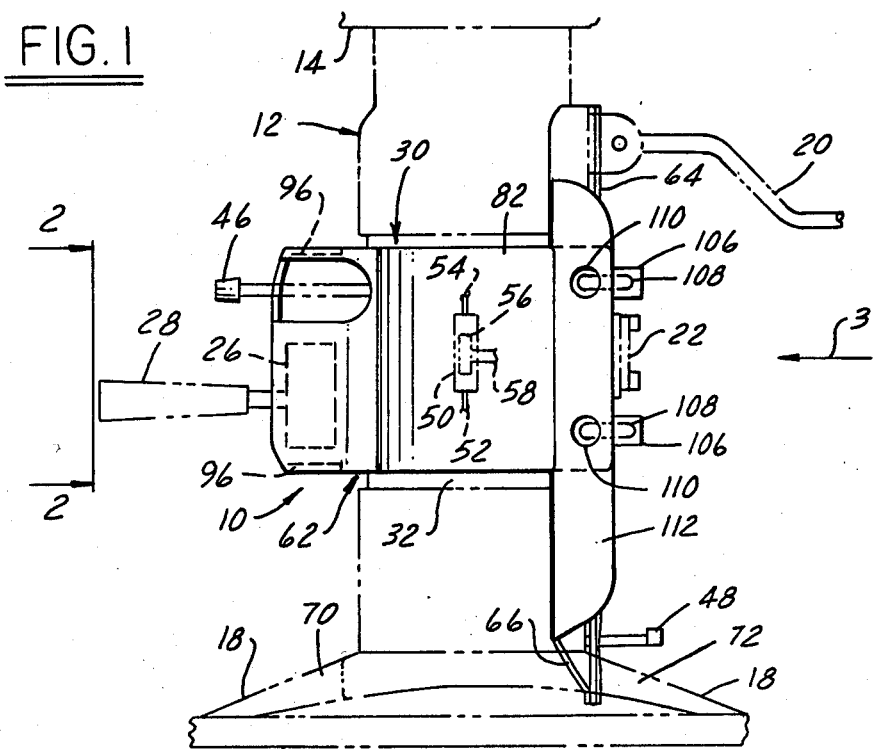
FIG. 1 is a plan view of a protective guard embodying this invention mounted on a conventional steering column of an automobile.
Figure 2:
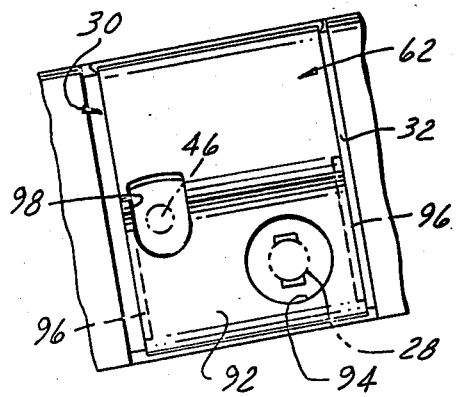
FIG. 2 is a fragmentary side view taken along lines 2—2 of FIG. 1 of the protective guard on the steering column.

Referring in more detail to the drawing, FIG. 1 illustrates a protective guard 10 embodying this invention mounted on a conventional steering column 12 extending from a dash board 14 of an automobile (not shown). To steer the automobile during normal operation, a steering wheel 16 with diametrically opposed spokes 18 is rotatably mounted on the end of the column. To shift the transmission of the automobile, a lever 20 is carried by the column for movement when in normal operation to shift or change the gears of the transmission which is usually an automatic transmission, but can be a manual shift transmission.

An ignition switch 22, emergency flasher switch 24, and a turn signal switch 26 with an actuating lever 28, are all mounted on the column and enclosed by a housing 30 secured to the column so that it is fixed and does not rotate about the longitudinal axis of the column with respect to the automobile. This housing has a generally cylindrical body 32 with projecting portions or protrusions 34 and 36 in which the ignition and turn signal switches are received.

The turn signal switch projecting portion or protrusion 36 is generally rectangular and has top and bottom walls 38 and 40 which are generally circumferentially spaced apart, a pair of end walls 42 which are generally axially spaced apart, and a side wall 44 through which the signal lever 28 projects. Usually, all these walls are generally flat. The steering column also has an optional tilt wheel mechanism with a control lever 46 projecting from the housing and an optional telescoping wheel mechanism with a projecting control lever 48.

When the ignition switch is moved to its locked position, it also locks both the steering wheel 16 and the shift lever 20 through conventional locking mechanisms (now shown), thereby trying to prevent unauthorized operation of the automobile. These locking mechanisms are engaged and released by movement of a rack 50 to which they are operably connected by wires 52 and 54. The rack is slidably mounted in the steering column and driven by a pinion 56 connected by drive shaft 58 to the ignition switch so that the shaft and pinion are rotated as the switch is manually turned back and forth between its "locked" and "on" positions.

Unauthorized persons, such as thieves, can obtain access to the rack and move it to release or unlock the steering wheel and shift lever by either pulling or popping the ignition switch out of the housing 30 or breaking the housing, which is usually made of relatively thin metal or plastic material, and hence is relatively weak. Typically, the housing is broken above the turn signal and tilt wheel levers to obtain easy and immediate access to the rack and control wires to release the steering wheel and shift lever locks so the automobile can be started and driven away under its own power. Even when thieves do not succeed in driving an automobile away, this breakage results in damage costing several hundred dollars to repair.

In accordancwe with this invention, guard 10 has an arm member 60 which in assembly is received on and secured to a carrier member 62. Preferably, each of these members is made of sheet steel which is plain carbon steel or stainless steel. If the members are made of plain carbon steel, preferably they are case hardened such as by nitriding. To insure that in use the members to not scratch or mar the steering column, wheel and shift lever, preferably they are coated with a suitable flexible rubber or plastic material such as vinyl or nylon.

To limit the extent to which the shift lever moves so that the transmission cannot be engaged, a positive stop is provided by a surface 64 disposed under and adjacent to the shift lever. To limit the extent to which the steering wheel can be turned, the arm 60 extends or projects into the plane or path of travel of the spokes 18 of the wheel. Preferably two positive stops are provided on the arm by surfaces 66 and 68. Each stop surface 66 and 68 is preferably inclined at an acute included angle to the axis of rotation of the steering wheel so that it is generally parallel to a complimentary surface 70 or 72 on the spoke 18 on which it will bear if the wheel is turned sufficiently to engage a spoke with the arm.

To provide clearance for the transmission shift lever, a notch 74 is cut out of the arm. Similarly, to provide clearance for the ignition switch, emergency flasher switch, and any telescoping wheel control lever, cut outs or holes 76, 78 and 80 are provided in the arm.

Figure 4:
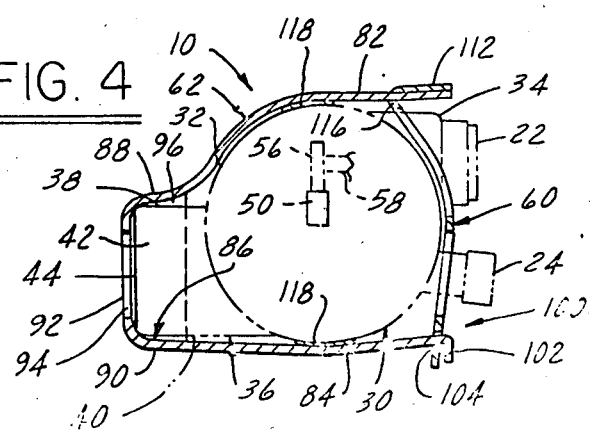
FIG. 4 is a sectional view taken generally on line 4—4 of FIG. 3 and further illustrating the mounting of the protective guard on the steering column.

As shown in FIGS. 1 and 4, the carrier 62 has a generally U-shaped configuration with upper and lower leg portions 82 and 84 which preferably extend generally tangentially to the main body 32 of the housing and generally parallel to each other. To prevent the arm from being forced out of position when the guard is in use, rotation and axial movement of the carrier with respect to the column must be limited. This is accomplished by the cooperation of a cavity 86 of the carrier with the turn signal projection 36 of the column housing.

To limit rotation of the carrier, the cavity has a pair of circumferentially spaced apart top and bottom wall portions 88 and 90 which overlap, lie adjacent to and can bear on the wall portions 38 and 40 of the projection 36. These upper and lower portions are connected by a preferably integral side wall portion 92 which has a through hole 94 to provide clearance for the turn signal lever 28.

To limit axial movement of the carrier, the cavity has a pair of axially spaced apart end wall portions 96 which overlap, lie closely adjacent to and can bear on the end walls 42 of the protrusion 36 of the column housing. Preferably, end wall portions 96 are homogenously integral with the side wall portion 92. If desired, the end wall portions 96 can be of sufficient length to extend the distance between the top and bottom cavity walls 88 and 90 and can even be welded to them. Clearance for the tilt wheel lever 46 is provided by a hole 98 which is preferably cut through a portion of both the upper and side cavity walls 88 and 92.

Figure 3:
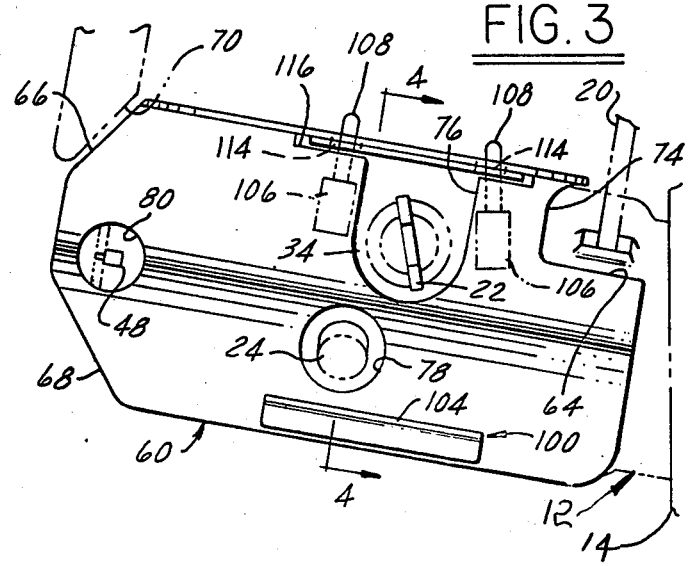
FIG. 3 is a fragmentary side view taken in the direction of arrow 3 in FIG. 1 of the protective guard on the steering column.

In accordance with another feature of this invention, to enable easy and rapid installation and removal of the arm and retention of the carrier on the column so that it need not be removed to permit authorized use of the vehicle, the arm is pivotally and releasably connected to the carrier by a hinge joint 100. This hinge joint is provided by the cooperation of an inclined tab 102 on the free end of the lower leg 84 with an elongate slot 104 in the arm through which the tab 102 can be inserted as shown in FIGS. 3 and 4. Preferably, the tab 102 is homogenously integral with the lower leg, inclined at generally a right angle thereto and has a generally vertical width or height greater than that of the slot so that when in the assembled position shown in FIG. 4, the arm cannot be removed from the lower leg.

When in assembled relation, the arm and carrier can be releasably locked together by one or more padlocks 106, each having a shank 108 passing through both the arm and the upper leg of the carrier. Each shank passes through a hole 110 through an integral flange 112 of the arm and a corresponding hole 114 through the upper leg. Preferably, the flange overlaps a portion of the upper leg which extends through a clearance slot 116 through the arm.

To install the guard 10, the padlocks 106 are removed and the arm 60 is disconnected from the carrier 62. The open end of the carrier 62 is inserted generally sideways over the levers 28 and 46 and into the position on the housing 30 of the column 12 shown in FIG. 4 with the turn signal housing projection 36 received in the cavity 86 of the carrier. Preferably, once installed, the carrier normally will be left on the column. The carrier is easily retained in its desired position on the column by strips of double-faced adhesive tape 18 positioned as shown in FIG. 4. The tape strips 118 can be applied to one of the carrier or column just before installation and then pressed into contact with the other of the carrier or column when the carrier is placed in the desired position on the column.

After the carrier is received on the column, the steering wheel and shift lever can be locked to prevent unauthorized use by assembling and securing the arm to the carrier. The arm is pivotally connected to the lower link of the carrier by manually manipulating the arm so that the tab 102 passes through the slot 104 and then the arm is pivoted to the generally vertically extending position shown in FIGS. 1 and 4 so that the upper leg 82 projects through the slot 96 of the arm and underlies its flange 112. With the arm in this generally vertical position, the shank 108 of each padlock is inserted through a pair of the holes 110 and 114 in the flange and leg, and the padlock is secured or locked so that the arm is retained on the carrier and cannot be removed an unauthorized person.

When the guard is in this assembled relation, one end of the arm projects into the plane of the spokes of the wheel which severely limits the extent to which the wheel can be turned. The other end of the arm projects under the shift lever to prevent the transmission from being engaged. Hence, the vehicle cannot be driven over a road or highway under its own power even if its engine is started by an unauthorized person. Moreover, the guard also provides a shield which protects most of the column housing 30 so that it cannot be broken to gain access to and manipulate the rack 50 to release the steering wheel and transmission lock of the motor vehicle.

Furthermore, very frequently a potential thief of a motor vehicle on which this guard is installed, will conclude it would be too difficult and time consuming to defeat this guard, and hence will not attempt to do so. Thus, this guard both protects the vehicle from theft and from damage and injury to the ignition switch, column housing or any other parts of the steering column. By preventing this damage, expensive repairs are avoided, which usually cost several hundred dollars.

I claim:

1. A protective guard for a steering wheel and a shift lever on a steering column with a housing between the steering wheel and shift lever and the housing having a projecting portion for enclosing a turn signal switch, the guard comprising, a metallic carrier member and a metallic arm member which can be assembled together to encircle the column housing in operative relationship therewith, said carrier member having a cavity constructed and arranged to receive at least part of the projecting switch portion of the housing when said members are assembled together in operative relationship with the column housing, said cavity having a first pair of wall portions generally circumferentially spaced apart and constructed and arranged to overlap with and lie adjacent wall portions of the projecting switch portion of the column housing and limit the extent to which said carrier member can be moved generally circumferentially with respect to the column housing when said members are assembled together in operative relationship with the column housing, and said cavity having a second pair of wall portions generally axially spaced apart and constructed and arranged to overlap and lie adjacent wall portions of the projecting switch portion of the column housing and limit the extent to which said carrier member can be moved generally axially with respect to the column housing when said members are assembled together in operative relationship with the column housing, said carrier member being generally U-shaped and having a pair of legs which are spaced apart and disposed generally on opposite sides of the column housing when said members are assembled together in operative relationship with said column housing, a hinge joint between one of said legs and said arm member which in assembly connects said one leg and arm member while permitting said arm to be pivoted so that said other leg and said arm can be releasably interlocked, said other leg and said arm being constructed and arranged such that they can be releasably locked together when said arm extends between said legs with said carrier and arm members together encircling the column housing when said members are assembled together in operative relationship with the column housing, a first stop carried by said arm member and constructed and arranged to underlie and be adjacent the shift lever to limit the extent to which the shift lever can be moved generally circumferentially in at least one direction with respect to the column when said members are assembled together in operative relationship with said column housing, at least one second stop carried by said arm and constructed and arranged to be lapped with a spoke of the steering wheel and to limit rotation of the steering wheel with respect to the column when bearing on the wheel when said members are assembled together in operative relationship with said column housing.

2. The guard of claim 1 wherein said pivotal joint is constructed and arranged such that when said arm member and said other leg are released and disengaged said arm member can be disconnected and removed from said carrier member so that said stops will not limit movement of the shift lever and the steering wheel with respect to the column.

3. The guard of claim 1 wherein said arm member and said other leg of said carrier each have at least one hole therethrough and each constructed and arranged so that a shackle of a padlock can be passed through both of said holes and the padlock locked to releasably secure the arm and carrier members together when said members are assembled together in operative relationship with the column housing.

4. The guard of claim 1 wherein said joint comprises a slot through one of said arm member and one leg and a tab on and inclined to an adjoining portion of the other of said arm member and one leg, and said tab being constructed and arranged to pass through said slot and when in assembly engage with said one of said arm member and one leg, whereby in assembly said arm is pivotally mounted and retained on said leg.

5. The guard of claim 1 which also comprises an opening through said arm member and constructed and arranged to provide clearance for an ignition switch carried by the column when said members are assembled together in operative relationship with the column housing.

6. The shield of claim 1 which also comprises an opening through said arm member and constructed and arranged to provide clearance for an emergency flasher switch carried by the column when said members are assembled together in operative relationship with the column housing.

7. The guard of claim 1 which also comprises an opening through said arm member and constructed and arranged to provide clearance for a lever for adjusting a telescoping mechanism carried by the column when said members are assembled together in operative relationship with the column housing.

8. The guard of claim 1 which also comprises an opening through said carrier member and constructed and arranged to provide clearance for a turn signal lever carried by the column when said members are assembled together in operative relationship with the column housing.

9. The guard of claim 1 which also comprises an opening through said carrier member and constructed and arranged to provide clearance for a tilt wheel adjustment lever carried by the column when said members are assembled together in operative relationship with the column housing.

10. The guard of claim 1 wherein said arm member has a flange portion which in assembly is lapped with said other leg of said carrier member and both said flange and said other leg each have at least one hole therethrough with said holes being constructed and arranged such that a shackle of a padlock can be passed through both of said holes and the padlock locked to releasably secure the arm and carrier members together when said members are assembled together in operative relationship with the column housing.

11. The guard of claim 10 which also comprises at least two pairs of said holes through said flange and said other leg with holes of each pair constructed and arranged to receive a shackle of a padlock such that when all the padlocks are locked the arm and carrier members are releasably secured together.

12. The guard of claim 10 wherein said arm member has a slot therethrough adjacent said flange and constructed and arranged so that a free end of said other leg can project through said slot and lap with said flange to receive the shackle of a padlock through said holes.

13. A protective guard for a steering wheel and a shift lever on a steering column with a housing between the steering wheel and shift lever and the housing having a projecting portion for enclosing a turn signal switch, the guard comprising, a metallic carrier member and a metallic arm member which can be assembled together to encircle the column housing in operative relationship therewith, said carrier member having a cavity constructed and arranged to receive and encircle at least part of the projecting switch portion of the housing to limit generally axial and generally circumferentially movement of said carrier member relative to the column housing when said members are assembled together in operative relationship with the column housing, said carrier member being generally U-shaped and having a pair of legs which are spaced apart and disposed generally on opposite sides of the column housing when said members are assembled together in operative relationship with the column housing, a hinge joint between one of said legs and said arm member which in assembly connects said one leg and arm member while permitting said arm member to be pivoted so that said other leg and said arm member can be releasably interlocked, said other leg and said arm member being constructed and arranged such that they can be releasably locked together when said arm member extends between said legs with said carrier and arm members together encircling the column housing when said members are assembled together in operative relationship with the column housing, a first stop carried by said arm member and constructed and arranged to underlie and be adjacent the shift lever to limit the extent to which the shift lever can be moved generally circumferentially in at least one direction with respect to the column when said members are assembled together in operative relationship with the column housing, at least one second stop carried by said arm and constructed and arranged to be lapped with a spoke of the steering wheel and to limit rotation of the steering wheel with respect to the column when said members are assembled together in operative relationship with the column housing.

14. The guard of claim 13 wherein said pivotal joint is constructed and arranged such that when said arm member and said other leg are released and disengaged said arm member can be disconnected and removed from said carrier member so that said stops will not limit movement of the shift lever and the steering wheel with respect to the column.

15. The guard of claim 13 wherein said arm member and said other leg of said carrier each have at least one hole therethrough and each constructed and arranged so that a shackle of a padlock can be passed through both of said holes and the padlock locked to releasably secure the arm and carrier members together when said members are assembled together in operative relationship with the column housing.

16. The guard of claim 13 wherein said joint comprises a slot through one of said arm members and one leg and a tab on and inclined to an adjoining portion of the other of said arm member and one leg, and said tab being constructed and arranged to pass through said slot and when in assembly engage with said one of said arm members and one leg, whereby in assembly said arm is pivotally mounted and retained on said one leg.

17. The guard of claim 13 wherein said arm member has a flange portion which in assembly is lapped with said other leg of said carrier member and both said flange and said other leg each have at least one hole therethrough with said holes being constructed and arranged such that a shackle of a padlock can be passed through both of said holes and the padlock locked to releasably secure the arm and carrier member together when said members are assembled together in operative relationship with the column housing.

18. The guard of claim 17 wherein said arm member has a slot therethrough adjacent said flange and constructed and arranged so that a free end of said other leg can project through said slot and lap with said flange to receive the shackle of a padlock through said holes.

19. The guard of claim 13 wherein said carrier member is a one piece member of sheet steel and said arm member is a separate one piece member of sheet steel.

20. The guard of claim 19 wherein said sheet steel members are case hardened plain carbon steel.

* * * * *